United States Patent [19]

Noomen et al.

[11] Patent Number: 5,219,958
[45] Date of Patent: Jun. 15, 1993

[54] COATING COMPOSITIONS INCLUDING ACID BLOCKED BASIC CATALYSTS

[75] Inventors: Arie Noomen, Voorhout; Johannes P. M. van Dongen, Sassenheim; Huig Klinkenberg, CS Katwijk aan Zee, all of Netherlands

[73] Assignee: Akzo N.V., Netherlands

[21] Appl. No.: 669,163

[22] Filed: Mar. 14, 1991

[30] Foreign Application Priority Data

Mar. 20, 1990 [EP] European Pat. Off. ........ 90200657.6

[51] Int. Cl.$^5$ ................... C08G 63/02; C08G 2/38; C08F 20/00
[52] U.S. Cl. .................................. 525/10; 525/425; 525/428; 525/444; 525/445; 526/213; 528/220; 427/384
[58] Field of Search ............ 526/213, 214, 215, 216; 427/384; 525/10, 425, 428, 444, 445

[56] References Cited

U.S. PATENT DOCUMENTS

| | | | |
|---|---|---|---|
| 2,759,913 | 8/1956 | Hulse | 260/89.7 |
| 4,217,396 | 8/1980 | Heekles | 428/500 |
| 4,408,018 | 10/1983 | Bartman et al. | 525/300 |
| 4,602,061 | 7/1986 | Akkerman | 525/10 |
| 4,698,406 | 10/1987 | Lo et al. | 528/12 |
| 4,871,822 | 10/1989 | Brindopke et al. | 526/271 |

FOREIGN PATENT DOCUMENTS

835809 4/1952 Fed. Rep. of Germany .

OTHER PUBLICATIONS

Bull. Acad. Polonaise de Sciences; Serie Chimique, vol. 23, No. 3, 1975 Warsaw, pp. 199–209; Kinstowski et al: "Studies on the Mechanism of Addition of Malonic Ester to Polarized Doublebond": p. 204 table, tests I 5–7, II 5–7; FIG. 10.
Revue Roumaine de Chimie, vol. 29, No. 7, Bukarest: pp. 575–582; El-Kasaby et al: "Michael Reaction of $\beta$-(2-Fluorenyl)-acrylic acid and its amides"; p. 577, lines 1–6; p. 580, lines 34–46.

*Primary Examiner*—Paul R. Michl
*Assistant Examiner*—Tae H. Yoon
*Attorney, Agent, or Firm*—James K. Poole; Louis A. Morris

[57] ABSTRACT

A thermosetting coating composition is provided, which composition is based upon (A) an activated unsaturated group-containing compound, (B) an activated CH group-containing compound and (C) a strong basic catalyst, wherein the strong basic catalyst is blocked with a [particular] carboxylic acid which is volatile and/or undergoes decarboxylation under curing conditions. These coating compositions possess extended potlife, good curing speed, and a good balance of physical and mechanical properties making them especially well suited for a variety of coatings uses such as in paint, impregnating, sealing and bonding compositions.

20 Claims, No Drawings

COATING COMPOSITIONS INCLUDING ACID BLOCKED BASIC CATALYSTS

The present application for patent is entitled to the benefit of an earlier filing date in a foreign country under 35 U.S.C. 119, based on priority application Serial No. 90200657.6, Europe, Mar. 20, 1990, which is hereby incorporated by reference.

BACKGROUND OF THE INVENTION

1. Field of the Invention

The present invention relates generally to coating compositions suitable for thermosetting applications, which compositions are based upon (A) compounds containing activated unsaturated groups and (B) compounds containing activated CH groups.

2. Description of Background Art

These compositions are, in general, known from a number of references including U.S. Pat. No. 2,759,913, DE-PS-835809, U.S. Pat. No. 4,871,822 (EP-A-0160824), U.S. Pat. No. 4,602,061, U.S. Pat. No. 4,408,018 and U.S. Pat. No. 4,217,396 (GB-A-2048913), all of which are incorporated by reference herein for all purposes.

For example, U.S. Pat. No. 2,759,913 and U.S. Pat. No. 4,871,822 generally disclose a composition of the above type which may be cured at ambient and elevated temperatures. More specifically, these references generally describe, as component (A), compounds containing at least two activated ethylenic double bonds and, as component (B), a wide variety of compounds including those containing at least two activated methylene and/or monosubstituted methylene groups.

U.S. Pat. No. 4,602,061 discloses a similar composition except that, as component (B), are specifically mentioned malonic group-containing oligomeric and polymeric esters.

U.S. Pat. No. 4,408,018 and U.S. Pat. No. 4,217,396 again disclose similar compositions except that, as component (B), are specifically mentioned acetoacetate groups-containing compounds.

It is also known from these references, and in general, that components (A) and (B) will react in the presence of a strong basic catalyst via a Michael addition. Because such catalyst is strongly basic, however, it has a tendency to become deactivated in the presence of certain acidic additives (e.g., certain pigments) or when the composition is applied to substrates having an acidic nature.

This effect can be overcome by increasing the amount of catalyst; however, the result is often an unacceptably short potlife. This disadvantage is exacerbated by the use of elevated temperatures.

SUMMARY OF THE INVENTION

The present invention overcomes this disadvantage by providing a thermosetting coating composition comprising:
(A) an activated unsaturated group-containing compound,
(B) an activated CH group-containing compound and
(C) a strong basic catalyst which is blocked with at least one carboxylic acid selected from the group consisting of:
  (a) a volatile monocarboxylic acid having a boiling point of less than about 270° C.;
  (b) a monocarboxylic acid which undergoes decarboxylation at a temperature of less than about 180° C.; and
  (c) a dicarboxylic acid which undergoes decarboxylation at a temperature of less than about 180° C.

The coating compositions in accordance with the present invention are in general suitable for a variety of coatings uses, for example, as paint, impregnating, sealing and bonding compositions. They are especially suited for use as protective coatings for metals, plastics and other well-known substrates.

These coating compositions possess extended potlife, good curing speed, and a good balance of physical and mechanical properties making them especially well suited for the aforementioned uses.

These and other features and advantages of the present invention will be more readily understood by those skilled in the art from a reading of the following detailed description.

DETAILED DESCRIPTION OF THE PREFERRED EMBODIMENTS

As mentioned earlier, the coating compositions in accordance with the present invention are based upon (A) activated unsaturated group-containing compounds, (B) activated CH group-containing compounds and (C) a strong basic catalyst, which strong basic catalyst is blocked in a manner more fully described below.

(A) Activated Unsaturated Group-Containing Compounds

As suitable compounds containing activated unsaturated groups may generally be mentioned ethylenically unsaturated compounds in which the carbon-carbon double bond is activated by a carbonyl group in the α-position. As representative examples of such may be mentioned those compounds disclosed in previously incorporated U.S. Pat. No. 2,759,913 (see especially column 6, line 35 through column 7, line 45), DE-PS-835809 (see especially column 3, lines 16–41), U.S. Pat. No. 4,871,822 (see especially column 2, line 14 through column 4, line 14), U.S. Pat. No. 4,602,061 (see especially column 3, line 14 through column 4, line 14), U.S. Pat. No. 4,408,018 (see especially column 2, lines 19–68) and U.S. Pat. No. 4,217,396 (see especially column 1, line 60 through column 2, line 64).

As a first preferred example may be mentioned the (meth)acrylic esters of compounds containing 1-6 hydroxyl groups and 1-20 carbon atoms. Instead of or in addition to (meth)acrylic acid may be used, for example, crotonic acid and cinnamic acid. These esters may optionally contain hydroxyl groups. Especially preferred examples include hexane diol diacrylate, trimethylol propane triacrylate and pentaerythritol triacrylate.

As a second preferred example may be mentioned polyesters based upon maleic, fumaric and/or itaconic acid (and maleic and itaconic anhydride), and di- or polyvalent hydroxyl compounds, optionally including a monovalent hydroxyl and/or carboxyl compound.

As a third preferred example may be mentioned polyester and/or alkyd resins containing pendant activated unsaturated groups. These include, for example, urethane (meth)acrylates obtained by reaction of a polyisocyanate with an hydroxyl group-containing (meth)acrylic ester, e.g., an hydroxyalkyl ester of (meth)acrylic acid or a compound prepared by esterification of a polyhydroxyl compound with less than a stoichiometric amount of (meth)acrylic acid; polyether (meth)acrylates obtained by esterification of an hydroxyl group-containing polyether with (meth)acrylic acid; polyfunctional (meth)acrylates obtained by reaction of an hydroxyalkyl (meth)acrylate with a polycarboxylic acid and/or a polyamino resin; poly(meth)acrylates obtained by reaction of (meth)acrylic acid with an epoxy resin; and polyalkylmaleates obtained by reaction of a monoalkylmaleate ester with an epoxy resin and/or an hydroxy functional oligomer or polymer.

Especially preferred of the activated unsaturated group-containing compounds are the aforementioned poly(meth)acrylates obtained by the reaction of (meth)acrylic acid with an epoxy resin.

It is also especially preferred that the acid value of the activated unsaturated group-containing compounds be about 2 or less.

As exemplified by the previously incorporated references, these and other activated unsaturated group-containing compounds, and their methods of production, are generally known to those skilled in the art, and need no further explanation here.

(B) Activated CH Group-Containing Compounds

As suitable compounds containing activated CH groups may be mentioned a wide variety of compounds as generally disclosed in previously incorporated U.S. Pat. No. 4,871,822 (see especially column 4, lines 15–28), which compounds contain a methylene and/or monosubstituted methylene group in the α-position to two activating groups such as, for example, carbonyl, cyano, sulfoxide and/or nitro groups. Preferred of these are compounds containing a methylene group in the α-position to two carbonyl groups, such as malonate and/or acetoacetate group-containing compounds.

As preferred examples of malonate group-containing compounds may be mentioned malonic acid esters as disclosed in previously incorporated U.S. Pat. No. 2,759,913 (see especially column 8, lines 51–52), and malonate group-containing oligomeric and polymeric compounds as disclosed in previously incorporated U.S. Pat. No. 4,602,061 (see especially column 1, line 10 through column 2, line 13). Preferred of these are the oligomeric and/or polymeric malonate group-containing compounds such as, for example, polyurethanes, polyesters, polyacrylates, epoxy resins, polyamides and polyvinyl resins containing malonate groups in the main chain, pendant or both.

The malonate group-containing polyurethanes may be obtained, for example, by reacting a polyisocyanate with an hydroxyl group-containing ester of a polyol and malonic acid, or by esterification or transesterification of an hydroxy functional polyurethane with malonic acid or a dialkylmalonate.

The malonate group-containing polyesters may be obtained, for example, by the polycondensation of malonic acid, an alkyl malonic acid (such as ethyl malonic acid), a mono- or dialkyl ester of such a malonic acid, and/or the reaction product of a malonic ester and an alkyl (meth)acrylate, optionally with other di- or polycarboxylic acids; with di- and/or higher functional hydroxy compounds; and, optionally monofunctional hydroxy and/or carboxyl compounds.

The malonate group-containing epoxy esters may be obtained, for example, by esterifying an epoxy resin with malonic acid or a malonic monoester, or by transesterification with a dialkyl malonate, optionally with other carboxylic acids and derivatives thereof.

The malonate group-containing polyamides may be obtained, for example, in the same manner as the polyesters, wherein at least a part of the hydroxy compound is replaced with a mono- and/or polyvalent primary and-/or secondary amine.

Other malonate group-containing polymers may be obtained by the transesterification of an excess of a dialkyl malonate with an hydroxy-functional polymer such as, for example, a vinyl alcohol/styrene copolymer. In this manner, a polymer with malonate group-containing side-chains may be formed. Any excess dialkyl malonate may be removed under reduced pressure or, optionally, be used as a reactive solvent.

Use may also be made of these malonate group-containing compounds in which the malonic acid structural unit is cyclized, for example, by formaldehyde, acetaldehyde, acetone or cyclohexanone.

Especially preferred of the malonate group-containing compounds for use with the present invention are the malonate group-containing oligomeric esters, polyesters, polyurethanes and epoxy esters containing 2–100, more preferably 2–20, malonate groups per molecule. It is also especially preferred that such malonate group-containing compounds have a number average molecular weight (Mn) in the range of from about 250 to about 3000 and an acid number of about 2 or less.

As preferred examples of acetoacetate group-containing compounds may be mentioned acetoacetic esters as disclosed in previously incorporated U.S. Pat. No. 2,759,913 (see especially column 8, lines 53–54), diacetoacetate compounds as disclosed in previously incorporated U.S. Pat. No. 4,217,396 (see especially column 2, line 65 through column 3, line 27), and acetoacetate group-containing oligomeric and polymeric compounds as disclosed in previously incorporated U.S. Pat. No. 4,408,018 (see especially column 1, line 51 through column 2, line 6). Preferred of these are the oligomeric and/or polymeric acetoacetate group-containing compounds.

Suitable acetoacetate group-containing oligomeric and polymeric compounds can be obtained, for example, from polyalcohols and/or hydroxy-functional polyether, polyester, polyacrylate, vinyl and epoxy oligomers and polymers by reaction with diketene or transesterification with an alkyl acetoacetate. Such compounds may also be obtained by copolymerization of an acetoacetate functional acrylic monomer with other vinyl- and/or acrylic-functional monomers.

Especially preferred of the acetoacetate group-containing compounds for use with the present invention are the acetoacetate group-containing oligomers and polymers containing at least 2 acetoacetate groups. It is also especially preferred that such acetoacetate group-containing compounds should have an Mn in the range of from about 234 to about 30,000 and an acid number of about 2 or less.

Compounds containing both malonate and acetoacetate groups in the same molecule are also suitable and can be obtained, for example, by a Michael reaction between a malonate functional polyester and an acetoacetate functional acrylic compound (e.g., acetoacetoxyethyl acrylate). Additionally, physical mixtures of malonate and acetoacetate group-containing compounds are suitable. Alkylacetoacetates can, in addition, be used as reactive diluents.

Again as exemplified by the previously incorporated references, these and other malonate and/or acetoacetate group-containing compounds, and their methods of production, are generally known to those skilled in the art, and need no further explanation here.

As mentioned earlier, the aforedescribed components (A) and (B) react with each other through a Michael addition, in which the activated CH group of component (B) adds to one of the carbon atoms of the activated unsaturated group of component (A). Components (A) and (B) are preferably contained in the coating compositions in an amount such that the ratio of the number of activated CH groups to the number of activated unsaturated groups is in the range of about 0.25 to about 4.0, more preferably in the range of about 0.5 to about 2.0.

(C) Blocked Basic Catalysts

As suitable basic catalysts for the Michael addition of components (A) and (B) may be mentioned a wide variety of amine and ammonium compounds disclosed in the previously incorporated references. As preferred catalysts may be mentioned amines of the amidine type, for example, tetramethyl guanidine, 1,4-dihydropyrimidines, 1,8-diaza-bicyclo[5.4.0]undec-7-ene, 1,4-diazabicyclo[2.2.2]octane and 2-alkyl-N-alkyl imidazolines. Other preferred catalysts include quaternary ammonium compounds, for example, quaternary ammonium hydroxides such as tetrabutyl ammonium hydroxide; quaternary ammonium alkoxides such as benzyltrimethyl ammonium methoxide and dilauryldimethyl ammonium methoxide; and quaternary ammonium carbanions such as benzyltrimethyl ammonium acetyl acetate.

These basic catalysts (in proportions based upon the unblocked versions) are generally utilized in amounts ranging from about 0.05 wt % to about 3.0 wt %, preferably from about 0.1 wt % to about 1.0 wt %, based upon the combined weight of components (A) and (B).

Suitable blocking agents for these basic catalysts comprise carboxylic acids selected from one or more of:
(a) volatile monocarboxylic acids having boiling points of less than about 270° C., preferably in the range of about 100° C. to about 150° C.;
(b) monocarboxylic acids which undergo decarboxylation at temperatures of less than about 180° C., preferably in the range of from about 80° C. to about 150° C.; and
(c) dicarboxylic acids which undergo decarboxylation at temperatures of less than about 180° C., preferably in the range of from about 80° C. to about 150° C.

It should be noted that by "volatile," in reference to the monocarboxylic acids, is it meant substantially volatile under the curing conditions of the compositions in accordance with the present invention, which curing conditions are further explained below. Generally, it has been found that monocarboxylic acids having boiling points in the above-described ranges meet this criteria.

These carboxylic acids are preferably weak acids having a pKa of about 9 or less, more preferably in the range of from about 2 to about 5.

Such carboxylic acids may be aliphatic, cycloaliphatic or aromatic, and preferably contain from 1 to 10 carbon atoms, more preferably from 1 to 8 carbon atoms. As examples of such may be mentioned formic acid, acetic acid, propionic acid, butanoic acid, pentanoic acid, hexanoic acid, heptanoic acid, benzoic acid, acetoacetic acid, cyanoacetic acid, 1,3-acetone dicarboxylic acid and malonic acid.

Especially preferred of the carboxylic acids are those containing 1–4 carbon atoms, particularly formic acid, acetic acid and propionic acid (volatile), and cyanoacetic acid (decarboxylating).

The carboxylic acid is preferably present in an amount of from about 10 to about 125, more preferably from about 25 to about 125, and especially from about 50 to about 100, equivalent percent based upon the active nitrogen in the catalyst. Within these ratios, the potlife of the composition can be readily varied, for example, between one half hour at 20° C. to more than 6 weeks at 50° C.

The basic catalyst and blocking agent can be mixed in situ and added to the composition in quantities to result in the desired ratio as set forth above. Alternatively, a salt of the catalyst and blocking agent can be pre-prepared and added to the composition. As preferred examples of such may be mentioned the salts of 1 molecule of tetramethyl guanidine or 1,8-diaza-bicyclo[5.4.0]undec-7-ene, and 1 molecule of benzoic acid, acetic acid or cyanoacetic acid.

The curing of the above-described coating compositions is preferably carried out at elevated temperatures above about 60° C. and, more preferably, at temperatures between about 80° C. and about 150° C.

Depending upon the field of application, the coating compositions in accordance with the present invention may optionally contain one or more pigments, dyes and usual intermediary agents, additives and/or solvents. Examples of suitable inert organic solvents include esters, ketones and aromatic and aliphatic hydrocarbons. Examples of suitable reactive organic solvents include dimethyl malonate, diethyl malonate, ethyl acetoacetate and 2-ethylhexyl acrylate.

As examples of preferred additives may may be mentioned minor amounts of a co-binder not containing activated unsaturated or CH groups, for example, cellulose acetate butyrate, acrylic, epoxy and polyester resins. As is known to one skilled in the art, these co-binders are commonly utilized in the coatings industry to modify certain properties such as drying speed and adhesion to substrates.

As mentioned earlier, the coating compositions in accordance with the present invention are suitable for a variety of coatings uses, for example, as paint, impregnating, sealing and bonding compositions. A preferred application is as a primer, topcoat and/or clearcoat in metallic basecoat systems.

These coating compositions may be applied to a substrate in any convenient manner such as, for example, by brushing, spraying or dipping. Suitable substrates include metals, wood, board, plastics and leather.

The foregoing more general discussion of the present invention will be further illustrated by the following specific examples.

EXAMPLES (A) Preparation of Activated Unsaturated Group-Containing Compounds (A1) Into a reactor were added 1750.0 parts by weight (pbw) of xylene, which were heated to boiling temperature. Next was added, over a period of three hours, a mixture of
1400.0 pbw of glycidyl methacrylate,
1935.5 pbw of styrene,
164.5 pbw of butyl acrylate, and 186.5 pbw of tert-butyl peroxy 3,5,5-trimethylhexanoate (commercially available under the trade designation Trigonox ® 42S from Akzo Chemicals),
and thereafter an additional 194.0 pbw xylene. The reaction mixture was kept at boiling temperature until a conversion of at least 98% was achieved.

To this first reaction product was added
645.5 pbw of acrylic acid,
6.0 pbw of hydrochinone monomethylether and
1.5 pbw of chromium(III) 2-ethylhexanoate commercially available under the trade designation Cordova AMC-2 from Cordova Chemicals),
and this mixture was reacted at 120° C. under throughput of air until the acid value had decreased below 1.

After addition of 1361.0 pbw of xylene and 367.0 pbw of n-butanol, a 53.2 wt % polymer solution was obtained with a viscosity of 85.7 cPa.s at 20° C., a color of 250 Apha, an acid value of 0.1 and an Mn of 3580.

(A2) Into a reactor were added 700.0 pbw of Solvesso (an aromatic hydrocarbon solvent containing trimethylbenzene, xylene, cumene and ethylbenzene which is available from Exxon Chemical Co., Houston, Tex.), which were heated to boiling temperature. Next were simultaneously dosed, through seperate inlets
(i) over a period of three hours, a first mixture of
955.0 pbw of glycidyl methacrylate,
855.0 pbw of styrene and
690.0 pbw of butyl acrylate; and
(ii) over a period of three hour and 10 minutes, a second mixture of
133.0 pbw of Solvesso 100 and
175.0 pbw of tert-butyl peroxy 3,5,5-trimethylhexanoate. The reaction mixture was kept at boiling temperature until a conversion of at least 98% was achieved.

To this first reaction product was added
421.1 pbw of acrylic acid,
4.0 pbw of hydrochinone monomethylether and
0.8 pbw of chromium(III) 2-ethylhexanoate, and this mixture was reacted at 120° C. under throughput of air until the acid value had decreased below 1.

After cooling and subsequent addition of 140.3 pbw of Solvesso 100, a 76.5 wt % polymer solution was obtained with a viscosity of 4486 cPa.s at 20° C., a color of 100 Apha, an acid value of 0.5 and an Mn of 1560.

(B) Preparation of Activated CH Group-Containing Compounds (B1) Into a reactor were added
429 pbw of dimethylmalonate,
611 pbw of dimethylolcyclohexane,
46 pbw of trimethylolpropane,
3 pbw of dibutyltin oxide and
44 pbw of xylene,
which mixture was heated to a temperature of 200° C. with stirring and under a nitrogen atmosphere. After heating for 2 hours, 80 pbw of xylene were slowly added, then the formed methanol distilled off over an additional two hours.

After cooling to 80° C., a mixture of 212 pbw of isophorone diisocyanate in 216 pbw xylene was added to the first reaction product over a period of one hour, after which the reaction was continued for an additional one hour at 100° C.

After cooling and subsequent addition of 355 pbw of xylene, a 76 wt % polymer solution was obtained with a viscosity of 320 cPa.s at 20° C., an acid number of 0.4, and OH number of 56, an Mn of 2830 and an equivalent weight of 542 (calculated on the polymer solution).

(B2) Into a reactor were added
257 pbw of trimethylolpropane,
336 pbw of benzoic acid,
508 pbw of dimethylolcyclohexane,
2 pbw of dibutyltin oxide and
83 pbw of xylene,
which mixture was heated at a temperature of 220° C. with stirring and under a nitrogen atmosphere until an acid number of less than 1 was reached.

After cooling to 100° C., 599 pbw of dimethyl malonate, 2 pbw dibutyl tinoxide and 110 pbw xylene were added to the first reaction product, then the mixture was heated to a temperature of 200° C. and the formed methanol distilled off over a period of two hours.

After cooling and subsequent addition of 372 pbw of xylene, a 76 wt % polymer solution was obtained with a viscosity of 125 cPa.s at 20° C., an acid number of 0.6, and OH number of 40, an Mn of 850 and an equivalent weight of 396 (calculated on the polymer solution).

(B3) Into a reactor were added
416 pbw of trimethylolpropane,
224 pbw of pentaerythritol,
911 pbw of neopentylglycol,
399 pbw of hexahydrophthalic anhydride,
350 pbw of isononanic acid and
140 pbw of xylene,
which mixture was heated at a temperature of 240 C. with stirring and under a nitrogen atmosphere until an acid number of less than 2 was reached.

After cooling, 1168 pbw of ethyl acetoacetate, 9 pbw of dibutyltin oxide and 1501 pbw of xylene were added to the first reaction product, then the mixture was heated to a temperature of 150° C. and the formed ethanol distilled off over a period of two hours.

A 70 wt % polymer solution was obtained with a viscosity of 30 cPa.s at 20° C., an Mn of 1210 and an equivalent weight of 638 (calculated on the polymer solution).

(C) Preparation of Blocked Catalysts (C1) A solution of 7.6 grams of 1,8-diazabicyclo[5.4.-0]undec-7-ene in 50 ml tetrahydrofuran was added dropwise to a solution of 6.1 grams of benzoic acid in 50 ml tetrahydrofuran. After stirring for one hour, the salt was isolated by evaporation of the solvent.

The recovered salt was purified by means of an ether/water extraction in a separatory funnel. After evaporation of the water layer, the salt was obtained in a yield of about 96% and a purity of 98%.

(C2) The procedure of (C1) was repeated, except that the benzoic acid was replaced with 4.25 grams of cyanoacetic acid.

(C3) The procedure of (C1) was again repeated, except that the benzoic acid was replaced with 3.0 grams of acetic acid.

EXAMPLE 1 AND COMPARATIVE EXAMPLE 1

A coating composition was prepared from 42.8 grams of (A1), 20.0 grams of (B1), 3.7 grams of methyl ethyl ketone, 13.0 grams of isobutyl acetate, 13.0 grams of butyl acetate and 7.5 grams of methyl isobutyl ketone. To this coating composition were added 0.3 grams of 1,5-diazabicyclo[4.3.0]non-5-ene (DBN) and 0.22 grams of formic acid.

As a comparison, the same coating composition was formulated but without the formic acid.

These compositions were tested both for geltime and solvent resistance to methyl ethyl ketone.

Geltime was tested by storing 100 g of the reaction mixture in a closed tin at a temperature as set forth below. The geltime is reported as the time when the mixture no longer flowed as a liquid upon stirring with a spatula.

Solvent resistance was tested by the following procedure: (1) the coating composition was first applied with a drawing bar onto a steel panel and cured for 25 minutes at 130° C. A drop of solvent was then applied to the so-cured coating and, after one minute, the solvent resistance was determined qualitatively as an indication of whether or not the coating softened.

The geltime of the composition of Example 1 (in accordance with the present invention) was more than 14 days at 20° C., while that of Comparative Example 1 (without blocking) was only 2 minutes at 20° C. Both Example 1 and Comparative Example 1 showed excellent solvent resistance, with no softening of either coating.

EXAMPLE 2 AND COMPARATIVE EXAMPLE 2

Example 1 and Comparative Example 1 were repeated, except that 0.28 grams of tetramethyl guanidine was utilized in place of the DBN.

The geltime of the composition of Example 2 (in accordance with the present invention) was again more than 14 days at 20° C., while that of Comparative Example 2 (without blocking) was only 4 hours at 20° C. Both Example 2 and Comparative Example 2 showed good solvent resistance, with only a slight softening of both.

EXAMPLE 3 AND COMPARATIVE EXAMPLE 3

Example 1 and Comparative Example 1 were again repeated, except that 0.84 grams of dilauryl dimethyl ammonium methoxide was utilized in place of the DBN.

The geltime of the composition of Example 3 (in accordance with the present invention) was again more than 14 days at 20° C., while that of Comparative Example 3 (without blocking) was only 20 hours at 20° C. Both Example 3 and Comparative Example 3 showed excellent solvent resistance, with no softening of either coating.

EXAMPLE 4

A coating composition was prepared from 43 2 grams of (A2), 39.1 grams of (B3), 5.9 grams of butyl glycol acetate and 11.8 grams of butyl acetate. To this composition were added 0.5 grams of 1,8-diaza-bicyclo[5.4.-0]undec-7-ene (DBU) and 0.3 grams of cyanoacetic acid.

The geltime of this example was 6 days at 50° C., and the solvent resistance was very good with only very slight softening of the coating.

EXAMPLES 5-10 AND COMAPRATIVE EXAMPLE 4

A coating composition was prepared as in Example 4. To this composition were added 0.37 grams of DBU and, respectively, 0.17 grams of formic acid (Example 5), 0.22 grams of acetic acid (Example 6), 0.27 grams of propionic acid (Example 7), 0.43 grams of hexanOic acid (Example 8), 0.48 grams of heptanoic acid (Example 9) and 0.45 grams of benzoic acid (Example 10). As comparison, a composition was formulated without acid (Comparative Example 4).

The compositions of Examples 5-10 all displayed a gel-time of over 3 weeks at 20° C., while the geltime of Comparative Example 4 was only 8 hours at 20° C. The solvent resistance for Examples 5-7 and Comparative Example 4 was excellent (with no softening), while that of Examples 8-9 was very good (very slight softening) and Example 10 was good (slight softening).

Examples 1-10 demonstrate in general that the use of the blocked catalyst in accordance with the present invention not only provides a much improved pot life, but also does not substantially affect the ultimate degree of crosslinking and, consequently, many of the resulting properties of the coating compositions.

EXAMPLES 11-13

The following Examples 11-13 demonstrate that the advantages of using the blocked catalysts in accordance with the present invention can also be obtained with pre-prepared blocked catalysts.

A coating composition was prepared from 47.9 grams of (A2), 20.7 grams of (B2), 10.5 grams of butyl glycol acetate and 20.9 grams of butyl acetate. To this composition were added, respectively, 1.0 grams of (C1) (Example 11), 1.3 grams of (C2) (Example 12) and 0.8 grams of (C3) (Example 13).

These compositions were tested for geltime at 50° C. After application of these compositions with a drawing bar onto a steel panel and curing for 25 minutes at 130° C., the resulting coatings were also tested for layer thickness, Persoz hardness, and solvent resistance to premium grade gasoline (after 5 minutes) and methyl ethyl ketone (after one minute). The results are given below.

|  | Example 11 | Example 12 | Example 13 |
|---|---|---|---|
| Geltime (50° C.) | 4 weeks | 8 days | 16 days |
| Layer Thickness ($\mu$m) | 35 | 33 | 36 |
| Persoz hardness (seconds) | 317 | 326 | 356 |
| Petrol Resistance | no soft. | no soft. | no soft. |
| M.E.K. Resistance | no soft. | no soft. | no soft. |

Many modifications and variations besides the embodiments specifically mentioned may be made in the compositions and methods described herein without substantially departing from the concept of the present invention. Accordingly, it should be clearly understood that the form of the invention described herein is exemplary only.

We claim:
1. A thermosetting coating composition comprising:
   (A) an activated unsaturated group-containing compound,
   (B) an activated CH group-containing compound and
   (C) a strong basic catalyst which is blocked with at least one carboxylic acid selected from the group consisting of:
      (a) volatile monocarboxylic acids having boiling points of less than about 270° C.;
      (b) monocarboxylic acids which undergo decarboxylation at temperatures of less than about 180° C.; and
      (c) dicarboxylic acids which undergo decarboxylation at temperatures of less than about 180° C.,
   where (A) and (B) are present in amounts such that the ratio of the number of activated CH groups to the number of activated unsaturated groups is in the range of from about 0.25 to about 4.

2. The coating composition of claim 1, wherein said carboxylic acid contains from 1 to 10 carbon atoms.

3. The coating composition of claim 2, wherein said carboxylic acid contains from 1 to 8 carbon atoms.

4. The coating composition of claim 3, wherein said carboxylic acid contains from 1 to 4 carbon atoms.

5. The coating composition of claim 1, wherein said carboxylic acid has a pKa of about 9 or less.

6. The coating composition of claim 5, wherein said carboxylic acid has a pKa in the range of from about 2 to about 5.

7. The coating composition of claim 1, wherien said strong basic catalyst (C) is a nitrogen base.

8. The coating composition of claim 7, wherein said stong basic catalyst is selected from amine and ammonium compounds.

9. The coating composition of claim 1, wherein said carboxylic acid is present in an amount of from about 10 to about 125 equivalent percent based upon the active nitrogen in the catalyst.

10. The coating composition of claim 9, wherein said carboxylic acid is present in an amount of from about 25 to about 125 equivalent percent based upon the active nitrogen in the catalyst.

11. The coating composition of claim 10, wherein said carboxylic acid is present in an amount of from about 50 to about 100 equivalent percent based upon the active nitrogen in the catalyst.

12. The coating composition of claim 1, wherein said strong basic catalyst (C) and blocking agent together form a salt.

13. The coating composition of claim 1, wherein (A) and (B) are contained in an amount such that the ratio of the number of activated CH groups to the number of activated unsaturated groups is in the range of about 0.5 to about 2.0.

14. The coating composition of claim 1, wherein the basic catalyst (in proportions based upon the unblocked version) is utilized in an amount ranging from about 0.05 wt % to about 3.0 wt %, based upon the combined weight of (A) and (B).

15. The coating composition of claim 14, wherein the basic catalyst (in proportions based upon the unblocked version) is utilized in an amount ranging from about 0.1 wt % to about 1.0 wt %, based upon the combined weight of (A) and (B).

16. A method of coating a substrate by applying a thermosetting coating composition comprising:
 (A) an activated unsaturated group-containing compound,
 (B) an activated CH group-containing compound, wherein (A) and (B) are contained in an amount such that the ratio of number of activated CH groups to the number of activated unsaturated groups is in the range of from about 0.25 to about 4 and
 (C) a strong basic catalyst which is blocked with at least one carboxylic acid selected from the goup consisting of:
  (a) volatile monocarboxylic acids having boiling points of less than about 270° C.;
  (b) monocarboxylic acids which undergo decarboxylation at temperatures of less than about 180° C.; and
  (c) dicarboxylic acids which undergo decarboxylation at temperatures of less than about 180° C.,
 then curing the coating composition at an elevated temperature.

17. The method of claim 16 wherein said basic catalyst is a nitrogen base and said carboxylic acid contains from 1 to 10 carbon atoms.

18. THe method of claim 16 wherien said strong basic catalyst (C) and the blocking agent together form a salt.

19. A thermosetting coating composition comprising:
 (A) an activated unsaturated group-containing compound,
 (B) an activated CH group-containing compound,
 (C) a catalyst comprising a nitrogen base which is blocked with at least one carboxylic acid containing from 1 to about 10 carbon atoms,
wherein (A) and (B) are present in amounts such that the ratio of the number of actuated CH groups to the number of activated unsaturated groups is in the range of from about 0.25 to about 4.

20. The coating composition of claim 19 wherein said catalyst is a salt of said nitrogen base and said carboxylic acid.

* * * * *

UNITED STATES PATENT AND TRADEMARK OFFICE
CERTIFICATE OF CORRECTION

PATENT NO. : 5,219,958
DATED : June 15, 1993
INVENTOR(S) : NOOMEN, Aries, et al.

It is certified that error appears in the above—identified patent and that said Letters Patent is hereby corrected as shown below:

Column 11, line 12, claim 7, "wherien" should read --wherein--;

Column 12, line 4, claim 19, after "compound", please insert -- and --;

Column 6, line 36, after "may", please delete second "may";

Column 2, line 61, "alkyd" should read -- acrylic --.

Signed and Sealed this

Twenty-sixth Day of July, 1994

Attest:

BRUCE LEHMAN

Attesting Officer

Commissioner of Patents and Trademarks